(12) United States Patent
Buda et al.

(10) Patent No.: US 10,191,461 B2
(45) Date of Patent: Jan. 29, 2019

(54) CONTROL DEVICE AND METHOD FOR SWITCHING INPUT/OUTPUT UNITS OF A CONTROLLER

(71) Applicant: WAGO Verwaltungsgesellschaft mbH, Minden (DE)

(72) Inventors: Aurel Buda, Minden (DE); Peter Galka, Berlin (DE); Detmar Hilgers, Obernkirchen (DE)

(73) Assignee: WAGO VERWALTUNGSGESELLSCHAFT MBH, Minden (DE)

( * ) Notice: Subject to any disclaimer, the term of this patent is extended or adjusted under 35 U.S.C. 154(b) by 281 days.

(21) Appl. No.: 14/891,800

(22) PCT Filed: May 15, 2014

(86) PCT No.: PCT/EP2014/059908
§ 371 (c)(1),
(2) Date: Nov. 17, 2015

(87) PCT Pub. No.: WO2014/184276
PCT Pub. Date: Nov. 20, 2014

(65) Prior Publication Data
US 2016/0103436 A1 Apr. 14, 2016

(30) Foreign Application Priority Data

May 17, 2013 (DE) .................... 10 2013 105 097

(51) Int. Cl.
*G05B 19/00* (2006.01)
*G05B 19/042* (2006.01)

(52) U.S. Cl.
CPC ..... *G05B 19/0423* (2013.01); *G05B 19/0426* (2013.01); *G05B 2219/25289* (2013.01)

(58) Field of Classification Search
CPC .... Y02B 60/10; Y02B 60/12; Y02B 60/1278; Y02B 60/1281; H04W 72/042;
(Continued)

(56) References Cited

U.S. PATENT DOCUMENTS 6,167,524 A * 12/2000 Goodnow ............. G06F 1/3203
                                                712/E9.049
6,715,088 B1 * 3/2004 Togawa ................ G06F 1/3203
                                                713/310
(Continued)

FOREIGN PATENT DOCUMENTS

CN       1834834 A      9/2006
CN     101405666 A      4/2009
(Continued)

OTHER PUBLICATIONS

Anonymous: "Common Application Profile PROFIenergy—Technical Specification for PROFINET—Version 1.1"; Aug. 2012.
(Continued)

*Primary Examiner* — Tan T. Nguyen
(74) *Attorney, Agent, or Firm* — Renner Otto Boisselle and Sklar

(57) ABSTRACT

The invention relates to a controller (1) comprising a control unit (2), which communicates with at least one input and/or output unit (10) via a data transmission channel (3, 6) for exchange of process data (P). The controller (1) has predetermined power saving process data (V) for power-saving states (En), which are associated with the input/output units (10), and is designed to access the predetermined power-saving process data (V) instead the exchanged process data (P) when in the power saving state.

11 Claims, 2 Drawing Sheets

Figure 1:
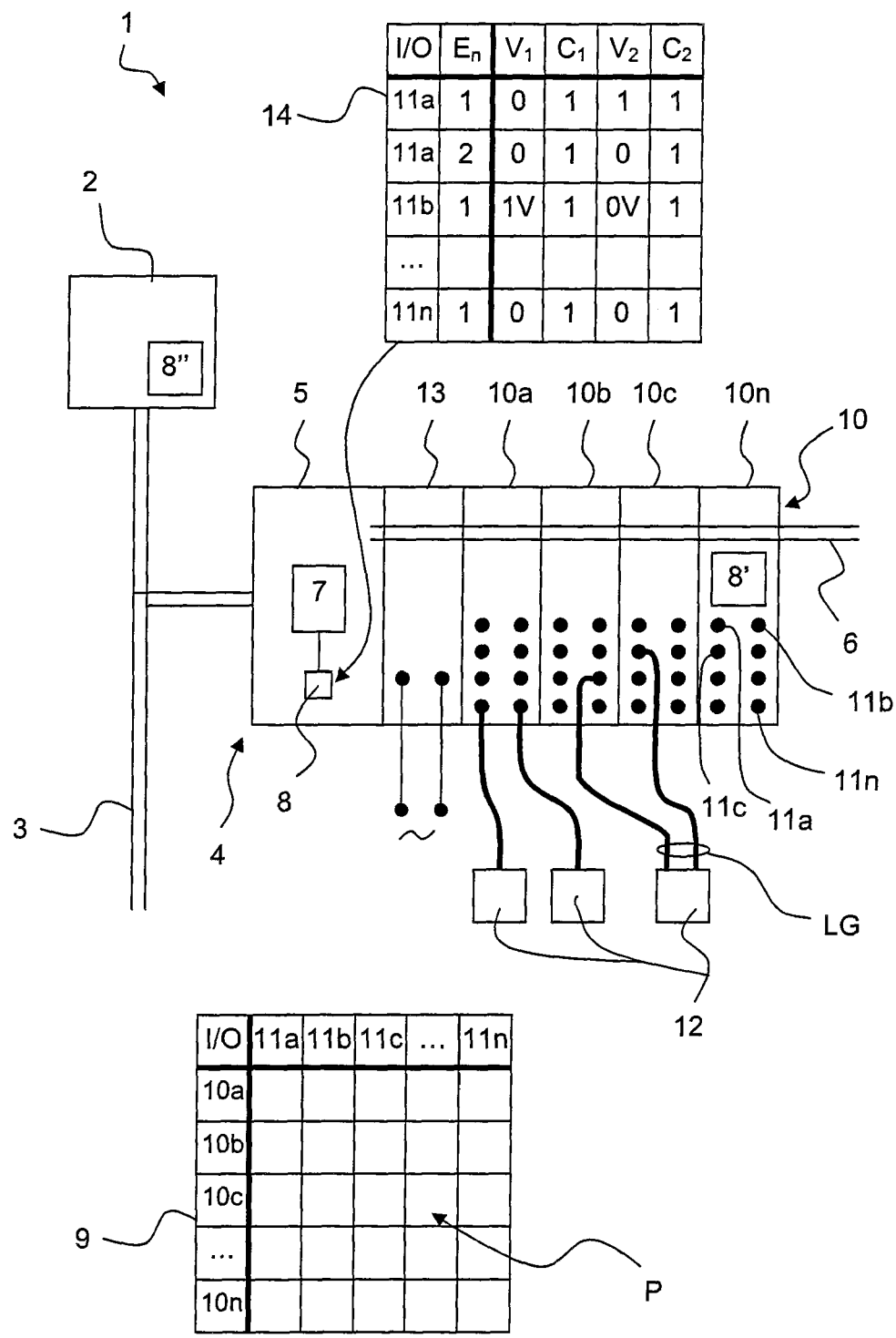

(58) Field of Classification Search
CPC .............. H04W 72/0446; H04W 84/12; G05B 19/0423; G05B 19/0426; G05B 2219/25289
USPC ............ 700/22; 710/100; 713/300, 320, 324
See application file for complete search history.

(56) References Cited

U.S. PATENT DOCUMENTS

| | | | | |
|---|---|---|---|---|
| 7,856,278 | B2* | 12/2010 | Okeda ................. | G05B 19/058 700/19 |
| 8,112,651 | B2* | 2/2012 | Wang ................... | G06F 1/3209 710/14 |
| 2006/0031692 | A1* | 2/2006 | Kato ..................... | G06F 1/3203 713/300 |
| 2010/0229010 | A1* | 9/2010 | Nasu .................... | G06F 1/3203 713/320 |
| 2011/0035739 | A1* | 2/2011 | Harada ................ | G06F 1/3203 717/168 |
| 2016/0103436 | A1* | 4/2016 | Buda ................... | G05B 19/0426 700/22 |

FOREIGN PATENT DOCUMENTS

| | | |
|---|---|---|
| CN | 101846997 A | 9/2010 |
| DE | 101 61 834 | 6/2003 |
| DE | 10 2009 047 803 | 3/2011 |
| DE | 10 2009 047 804 | 3/2011 |
| DE | 10 2009 047 805 | 3/2011 |
| DE | 102010035771 A1 | 2/2012 |
| EP | 1686767 A1 | 8/2006 |
| EP | 1703347 A2 | 9/2006 |
| EP | 2 202 599 | 6/2010 |
| EP | 2 400 360 | 12/2011 |
| EP | 2 538 609 | 12/2012 |
| EP | 2538609 A1 | 12/2012 |
| EP | 2 574 997 | 4/2013 |
| WO | 2012/113445 | 8/2012 |

OTHER PUBLICATIONS

International Search Report dated Aug. 6, 2014 for International Application No. PCT/EP2014/059908 and English translation thereof.

* cited by examiner

CONTROL DEVICE AND METHOD FOR SWITCHING INPUT/OUTPUT UNITS OF A CONTROLLER

This application is a national phase of International Application No. PCT/EP2014/059908 filed May 15, 2014.

The invention relates to a controller comprising a control unit, which communicates with at least one input and/or output unit via a data bus for exchange of process data.

The invention further relates to a method for switching of input and/or output units of a controller into a power state, in which the power consumption of the bus members, which are connectable to the input/output units, is reduced.

For controllers, in particular for programmable logic controllers, it is often necessary to reduce the power consumption of bus members, which are connected to a peripheral field bus controlled control unit.

EP 2 574 997 A1 discloses a method for the adjustment of operating states in production facilities according to the PROFI-energy-standard. Thereby a structure model, at least one process model as well as an operating state model is used to generate an overall operating state model. This overall operating state model reflects all time dependencies for the switching off of components of a process control facility. Commands according to the PROFI-energy-standard are used thereby for the power management of the individual components of the facility.

WO 2012/113445 discloses a device for switching a power supply of an electrically drivable device comprising an input for a first electric line and an output for a second electric line and a switch lying in between for switching on and off the electric connection between the input and the output. The controller receives data signals transmitted on the first electric line via the input, to control the switch according to that. Thereby a remotely controlled switch off of devices connected to the controller is possible.

Such peripheral controllers have the disadvantage of a relatively large hardware investment. In addition, the power-saving state for a group of devices is given with the hardware during installation and cannot be adjusted flexibly during configuration or even operation.

DE 10 2009 047 803 A1, DE 10 2009 047 804 A1 and DE 10 2009 047 805 A1 describe a programmable logic controller system comprising a main processor unit and a peripheral unit, which are connected with each other via a bus system. Via the bus system it is possible to enable an event-controlled selective or collective switching on and/or off of a power supply that is provided to the respective peripheral unit via the bus system, for every peripheral unit, to reduce the power consumption of the programmable logic controller system.

Based hereof it is the problem of the present invention to develop an advanced controller as well as an advanced method for switching of input and/or output units of such a controller into a power-saving state, in which the selection, grouping and controlling of input and/or output units or parts thereof for switching into a power-saving state is simplified.

This problem is solved by the controller comprising the features of claim 1 as well as by the method comprising the features of claim 7. Preferred embodiments are described in the dependent claims.

In a controller comprising a control unit, which communicates with at least one input/output unit via a data transmission channel (as for example a field bus) it is suggested, that the controller has available predetermined power-saving process data for power-saving states, that are assigned to the input/output units, and is adapted to access the predetermined power-saving process data instead of an exchange of process data while being in the power-saving state.

In such a preferred programmable logic controller, process data are exchanged between the input/output units and the control unit, e.g. via process data images. Such a controller can be a programmable controller (SPS/PLC or the like) or an interconnected field bus coupler or field bus controller of a field bus node, which is subordinated to a higher-ranked controller.

According to the teaching of the present invention selected input and/or output units or parts thereof can be switched into a power-saving state, wherein then the power-saving process data, that are predetermined for those input and/or output units and/or parts thereof, are used, instead of the process data that are, for example, exchanged via a process data image.

Thereby a parametrization and switching of input/output units, individual or in groups, can be achieved in a very easy and flexible manner by centralized or peripheral checking for the existence of switching actions or if available by transmission of switching commands via the data transmission channel.

Consequently it is suggested to assign the input/output units or parts thereof at least one power-saving state via appropriate power-saving process data and to use these predetermined power-saving process data as substitute values for the process data that are otherwise exchanged e.g. via a process data image.

By storing predetermined power-saving process data, which are assigned in the input/output units including parts thereof, it is possible in an easy manner to define power-saving profiles for the available input/output units and their channels with the bus members connected thereto. The switchover into the power-saving state for selected input/output units and their channels as well as of groups of such channels can be carried out in an easy manner by activation of a predetermined power-saving profile. A higher-ranked controller and/or control routine does not need to have any knowledge thereby about the controlling in practice of the subordinated units to transfer them into a power state. Rather, this is predefined outside of the control as a power-saving profile. Moreover the flexible possibility is given to the user to transfer particular bus members into desired power-saving states due to the possibility to define power-saving profiles for individual channels or groups of channels without knowledge of particular bus members.

Thereby, it is particularly preferable, if the predetermined power-saving process data are assigned to individual channels of the input/output units. The controller is then adapted to switch selected channels of the input/output units into a power saving state, by accessing to the assigned predetermined power-saving process data for the selected channel, instead of a usage of process data of the respective channel, e.g. by exchange of process data.

A power-saving profile with predetermined process data can thus be determined for individual channels of the input/output units, which then, as needed, are set individually or in groups into the power-saving state. In the power-saving state the predetermined power-saving process data for the respective channel set into the power-saving state have preference and are used instead of the exchanged process data.

Thereby, it is thinkable that the predetermined power-saving process data are written from a controller into the process data image, wherein the data of the process data image are transmitted then from the controller or coupler, which comprises the process image, to the connected input/output units.

It is also thinkable, that the input/output units connected to the controller via a data transmission channel access by themselves and use the predetermined power-saving process data for the respective channel, which are stored in the input/output unit, after receipt of a power-saving request (e.g. in terms of a switching criteria or a power-saving command) from the controller or after detection, that a criteria for switching into the power-saving state is fulfilled, instead of the process data exchanged via the data transmission channel.

To this, the input/output units can comprise a memory unit respectively for storing the power-saving process data predetermined for the input/output units.

It is also thinkable, that the controller comprises a memory unit for storing the predetermined power-saving process data assigned to the connected input/output units. These stored power-saving process data can then be written from the controller, e.g. into the process image, if an addressed input/output unit or a channel thereof is in the power-saving state.

An optional embodiment provides, that a separate power-saving control module is switched into the data channel, e.g. between a head module and the input/output units connected thereto. It can be implemented e.g. as a block module of a modular field bus node. The power-saving process data are then stored in a memory unit of the power-saving control module as the at least one power-saving profile, preferably in combination with associated switching criteria. The power-saving control module can optionally comprise the logic for the determination if, for the individual input/output units and/or their channels, the predetermined, stored switching criteria for switching into a respective power state are fulfilled. Then the stored power-saving process data are written into the process image or directly transmitted to the respective input/output modules for further use.

The input/output units are preferably connected to the controller via a field bus controller or field bus coupler. The field bus controller/field bus coupler then comprises a memory unit for storing a process image for the process data to be exchanged and for the storing of the predetermined power-saving process data assigned to the connected input/output units. For the method according to the invention for switching input/output units of a controller into a power-saving state it is suggested, that power-saving process data, which are assigned to the individual input/output units including parts thereof (e.g. channels), are stored in a step of the configuration and/or parametrization. These stored power-saving process data are accessed, e.g. during operation of a controller, if an input/output unit or a part thereof is switched into a power-saving state. Then, stored power-saving process data that are assigned to the part of the input/output unit that is in the power-saving state are used, instead of process data, which is exchangeable between the input/output units and a controller that is connected via a data transmission channel.

Thereby, it is particularly preferred, if the method for switching comprises the steps:

parametrizing of channels of the input/output units with at least one power-saving state comprising at least one predetermined power-saving process datum assigned to the channel to be parametrized as a output value for the channel, that is taken by the output of the channel instead of a process datum predetermined by a controller via a process image, and comprising a switching criteria, and switching into the power-saving state after a check by means of the controller or by a power-saving control module connected to the data transmission channel, whether a power-saving state is parametrized by specification of power-saving process data and whether the switching criteria parametrized for the respective channel is fulfilled by a switching criteria that is currently received together with a switching request for switching of at least one channel of input/output units into a power-saving state, or by a detected switching criteria.

It is also thinkable, that the method for switching comprises the steps:

parametrizing of channels of the input/output units with at least one power-saving state, which includes at least one predetermined power-saving process datum assigned to the channel to be parametrized, as a output value for the channel, and a switching criteria. The output of the channel that is switched into the power-saving state then adopts the predetermined power-saving process datum as output value, instead of a process datum predetermined by a controller via a process image.

transmitting a request for switching of at least one channel of input/output units into a power-saving state comprising a switching criteria to the at least one input/output unit and switching into the power-saving state after a check by means of the addressed input/output unit, whether a power-saving state is parametrized by specification of power-saving process data and whether the parametrized switching criteria for the respective channel is fulfilled by the transmitted switching criteria.

Figure 2:
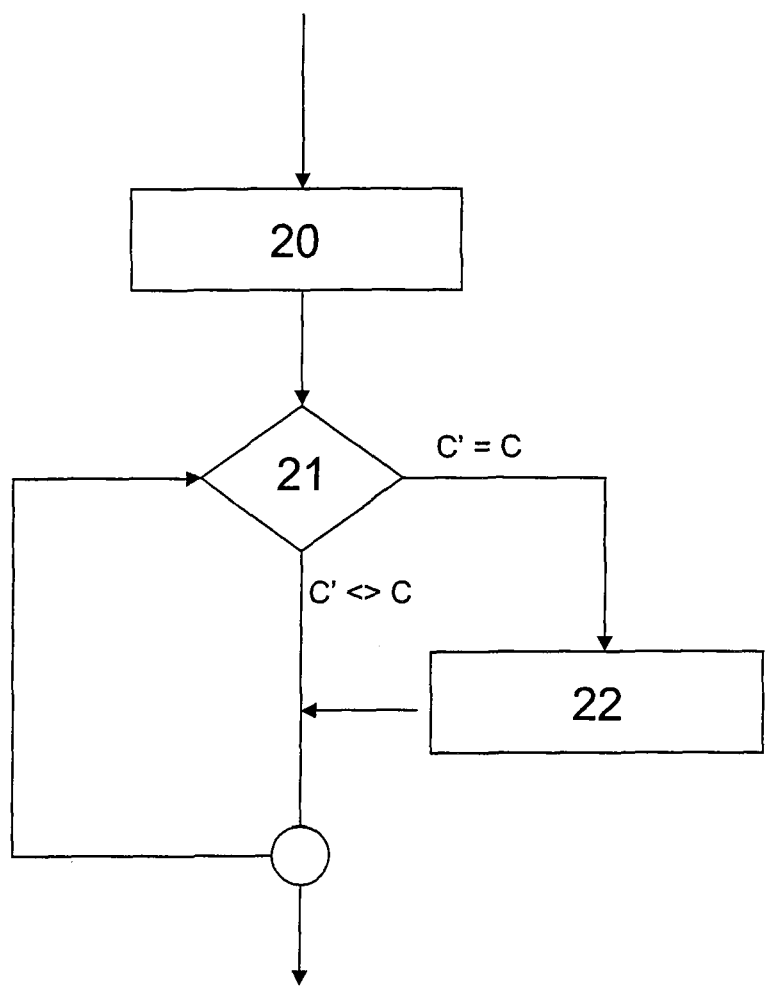

The invention is explained in more detail subsequently by means of an exemplary embodiment and the enclosed figures. It shows:

FIG. 1 a block diagram of a controller comprising a control unit, a field bus controller/-coupler and input/output units connected thereto;

FIG. 2 a flow chart of a method for switching input/output units into a power-saving state.

FIG. 1 shows a block diagram of a controller 1 that comprises a programmable logic controller unit (2) in per se known manner. The programmable logic controller 2 is adapted to execute a control program and to exchange process data P via a field bus 3 with at least one network node 4. The network node 4 comprises a field bus controller/-coupler 5. The field bus controller/-coupler 5 is adapted to convert data between the protocol of the field bus 3 to the communication protocol of an internal proprietary data transmission channel 6 and vice versa. Hereby the field bus controller/-coupler 5 comprises a processing unit 7 as well as a memory unit 8, which is connected thereto. In the memory unit 8 a process data image 9 is stored, in which process data P for the input/output units 10, which are connected to the field bus controller/-coupler 5 via the internal data transmission channel 6, are stored.

Thereby an exchange of process data P takes place, from the process image 9 to the connected input/output units 10 and vice versa, via the data transmission channel 6. In this manner predetermined process data P can be written into the process data image 9 by means of the control unit 2 via the field bus 3. The field bus controller/-coupler 5 transmits these process data P from the process data image 9 to the input/output units 10, e.g. cyclic according to the communication protocol of the data transmission channel 6. These input/output units 10 can itself write process data P into the process data image 9 via the data transmission channel 6. These process data P can then be transferred from the field bus controller/-coupler 5 to the control unit 2 via the field bus 3.

The input/output units 10 comprise one or a plurality of channels 11a, 11b, ..., 11n respectively, to which the bus members 12 can be connected. Such bus members 12 can be actuators, sensors or other devices.

The bus members 12 are supplied with electric power (line voltage) via a voltage supply module 13 of the modular arranged node 4. Hereby, it is about a 24 volt, no volt or 220 volt voltage supply for example, which allows a significant higher current flow (>5 ampere) than the voltage supply for the electronic of the node 4, which is provided usually together with the data transmission channel 6.

In order to set individual input/output units 10 or individual channels 11a, 11b, ..., 11n of the input/output units 10 individually or in groups into a power-saving state in an easy and flexible manner, in which the power consumption is reduced, a parametrization of the channels 11a, 11b, ..., 11n, with a number of power states $E_n$ from 1 to n, is carried out. A power state $E_n$ is described thereby by two attributes. On the one hand a power-saving process datum V is provided, which describes the output value of the assigned channel, which the channel 11a, 11b, ..., 11n shall adapt, if this one is switched into the power state. Furthermore a switching criteria C is provided that describes a decision criteria in order to switch into a power state. Thus, the specification of a pause time, e.g. according to the PROFI-energy-standard, can be used as a criteria C. In the sercos energy-standard the criteria C is described by an identification number.

During the engineering, output channels 11a, 11b, ..., 11n or groups of such output channels of connected input/output units 10 are assigned to at least one power state $E_n$. The assigned power states $E_n$ can then be stored in a table 14. The power state table 14 can be stored for example in the field bus controller/-coupler 5 of the higher-ranked control unit 2 or also in a memory unit 8, 8', 8'' available in the individual input/output units 10. In case that the power state table 14 is stored in the individual input/output units 10, preferably only the power states for the channels 11a, 11b, ..., 11n of the respective input/output unit 10 are present in the table.

During the engineering, output channels 11a, 11b, ..., 11n or groups of such output channels of connected input/output units 10 are assigned to at least one power state En. The assigned power states En can then be stored in a table 14. The power state table 14 can be stored, for example, in a memory unit 8 of the field bus controller/-coupler 5, or a memory unit 8'' of the higher-ranked control unit 2 or also in a memory unit 8' available in the individual input/output units 10. In case that the power state table 14 is stored in the individual input/output units 10, preferably only the power states for the channels 11a, 11b, ..., 11n of the respective input/output unit 10 are present in the table.

For a more simple addressing it is thinkable to configure groups of channels 11a, 11b, ..., 11n or groups of input/output units 10. Thereby the control of power states during operation is simplified, as the configuration of the power states of outputs of bus clamp units is managed. The configuration, management and storing of groups is carried out, for example, by the field bus controller/-coupler 5. The power-saving states of groups can be controlled independent of each other during operation. The field bus controller/-coupler 5 can thereby manage a number of groups from 1 to n.

By the implementation of groups logic units can be formed, e.g. for connected plant components connected via different output channels 11a, 11b, ..., 11n and bus clamp units (input/output units 10). Different plant components can hereby set into power states decoupled from each other. Time or other dependencies can be respected by the control unit 2.

Moreover, a group can also include all channels 11a, 11b, ..., 11n of the input/output units 10. Hereby all output channels 11a, 11b, ..., 11n can be managed by one address and thereby set into power-saving states by one command via the field bus 3.

Thereby power-saving states and/or power-saving functions can be applied to individual channels 11a, 11b, ..., 11n and any groups of such channels.

On the basis of the right bus member 12 it is obvious, that bus members 12 can also be connected to multiple channels 11a, 11b, ..., 11n of the same or different input/output units 10. These channels 11a, 11b, ..., 11n are then clustered to a logic (sub-) group LG, wherein power states $E_n$ are settable altogether for such a logic (sub-) group LG.

The control of power functions can be carried out e.g. via a non-real-time channel of the field bus 3 and/or of the data transmission channel 6. Requests for the control of a power state can thereby be applied to individual output channels 11a, 11b, ..., 11n and/or output channel groups or to groups of output channels 11a, 11b, ..., 11n managed by the field bus controller/-coupler 5.

The process for switching into a power-saving state for an output channel 11a, 11b, ..., 11n is simplified as follows:

1) A request is carried out by the control unit 2 via the field bus 3 to engage the power state. As a parameter such a request always comprises a criteria C. In case there is a power state $E_n$ configured for the addressed output channel 11a, 11b, ..., 11n that corresponds to this criteria C, the output of this channel 11a, 11b, ..., 11n is switched to the assigned power substitute value V as associated predetermined power-saving process datum of the configured power state $E_n$. The synchronous real-time process data are not mapped to this output channel 11a, 11b, ..., 11n from this time on.

2) A request is carried out to leave the power state. The addressed output channel 11a, 11b, ..., 11n leaves then the power state $E_n$ and switches then into the normal process data exchange e.g. via a process image.

The process for switching into a power state for groups is simplified as follows:

1) A request is carried out to engage a power state $E_n$. As a parameter such a request always comprises a criteria C. For every output channel 11a, 11b, ..., 11n and/or every group of such output channels of the addressed group it is checked, whether a power state $E_n$ with corresponding criteria C is configured. If this is the case, the output of this channel 11a, 11b, ..., 11n is switched to the associated power substitute value V, i.e. the predetermined power-saving process datum of the configured power state $E_n$. The synchronous real-time process data are not mapped to these output channels 11a, 11b, ..., 11n from this time on.

2) A request is carried out to leave again the power state $E_n$. All configured output channels 11a, 11b, ..., 11n of the addressed group leave then their power state $E_n$, insofar as they are in such, and switch back into the normal process data exchange.

The method becomes more obvious with the help of FIG. 2.

In a step 20 a configuration is carried out as predetermined power-saving process data V (power substitute values) assigned to the individual input/output units 10 and/or their channels 11a, 11b, . . . , 11n are stored for a power-saving state $E_n$.

During operation, in which a control unit 2 runs for example a programmable logic controller program, individual channels 11a, 11b, . . . , 11n or groups thereof as well as individual selected input/output units 10 and/or groups thereof, can be set into a power-saving state, as needed. Hereby in step 21 it is checked repeatedly during process, whether a stored criteria C, which is predetermined for at least one power state $E_n$, is fulfilled (is C'=C fulfilled?). If this is the case, a switching of the output channels 11a, 11b, . . . , 11n, for which the criteria C is fulfilled, into the power-saving state, is carried out in step 22. Hereby an access to the stored power-saving process data V (power substitute values) of the affected input/output units 10 and/or the affected channels 11a, 11b, . . . , 11n is carried out, wherein then these stored power-saving process data V are used instead of process data that are exchangeable between the input/output unit 10 and a control unit 2, 5 that is connected via a data transmission channel 6 thereto.

In the described embodiment the switching into the power-saving state can also be carried out by means of the field bus controller/-coupler 5 itself as a control unit without a higher-ranked control unit 2 or autonomously by the input/output units 10. It is thereby merely required that the field bus controller/-coupler 5 or the input/output units 10 are able to check, by means of appropriate hard- and/or software, the existence of a criteria C by means of process data or control data provided, to switch then into the power-saving state.

The invention claimed is:

1. Controller comprising a control unit which communicates with at least one input and/or output unit via a data transmission channel for exchange of process data, wherein
the controller has predetermined power-saving process data for power-saving states of the input/output units assigned to the input/output units, and is adapted to access the predetermined power-saving process data instead of the exchanged process data when being in the power-saving state,
wherein the predetermined power-saving process data are assigned to individual channels of the at least one input and/or output unit, and
wherein the control unit is adapted, by means of the power-saving process data, to switch selected channels, with bus members connected thereto, of the input/output units into a power-saving state, by accessing the assigned predetermined power-saving process data for the selected channel instead of using process data of the respective channel in order to switch the input/output units and the bus members into a power-saving state,
wherein by defining power-saving profiles for individual channels particular bus members can be transferred into power-saving states without knowledge of the particular bus members, and
the switchover into the power-saving state for selected input/output units and their channels is carried out by activation of a predetermined power-saving profile.

2. Controller according to claim 1, wherein
the controller is adapted to switch groups of input/output units or groups of channels of input/output units for access to the predetermined power-saving process data into a power-saving state.

3. Controller according to claim 1, wherein
the input/output units comprise a memory unit for storing the power-saving process data predetermined for the input/output units.

4. Controller according to claim 1, wherein
the control unit comprises a memory unit for storing the predetermined power-saving process data assigned to the connected input/output units.

5. Controller according to claim 1, wherein
the input/output units are connected to the control unit via a field bus controller or field bus coupler, wherein the field bus controller or field bus coupler comprises a memory unit for storing a process image for the process data to be exchanged and for the storing of the predetermined power-saving process data assigned to the connected input/output units.

6. A method for switching input and/or output units of a controller into a power-saving state of the input/output units, in which the power consumption of bus members, which are connectable to the input/output units, is reduced, the method comprising:
storing predetermined power-saving process data for individual channels of input/output units for at least one power-saving state, that are assigned to the individual input/output units, wherein power-saving profiles for individual channels are defined such that particular bus members can be transferred into power-saving states without knowledge of the particular bus members;
accessing the stored power-saving process data of an input/output unit, if the input/output unit has, at least partially, been switched into a power-saving state, wherein then these stored power-saving process data are used instead of process data that is exchangeable between the input/output unit and a connected control unit, via a data transmitting channel; and
during switchover into a power-saving state, switching selected channels, with the bus members connected thereto, and, at least partially, the input/output unit into the power-saving state without knowledge of the control unit of controlling the particular bus members, by means of the power-saving process data.

7. The method according to claim 6, wherein
storing the predetermined power-saving process data and accessing to these predetermined power-saving process data, if an assigned channel was set into a power-saving state.

8. The method according to claim 6, wherein
storing the predetermined power-saving process data takes place in memory units of the input/output units, the control unit, a field bus controller or field bus coupler, interconnected between a control unit and the input/output units, and/or a power-saving control module connected to the data transmitting channel.

9. The method according to claim 6, comprising:
group-related storing of predetermined power-saving process data for a group of input/output units or for a group of channels of such input/output units and accessing to the stored power-saving process data of such a group, if the input/output units or channels of the group are set into a power-saving state altogether.

10. The method according to claim 6, comprising:
parametrizing of channels of the input/output units with at least one power state comprising at least one predetermined power-saving process datum assigned to the channel to be parametrized, as an output value for the channel, that is taken by the output of the channel instead of a process datum predetermined via a process image by a control unit, and comprising a switching criteria, transmitting of a request for switching of at least one channel of input/output units into a power-saving state comprising a switching criteria to the at least one input/output unit and switching into the power-saving state after checking, by means of the addressed input/output unit, if a power-saving state is parametrized by specification of power-saving process data and if the parametrized switching criteria for the respective channel is fulfilled by the transmitted switching criteria.

11. The method according to claim 6, comprising:
parametrizing of channels of the input/output units with at least one power state comprising at least one predetermined power-saving process datum assigned to the channel to be parametrized, as an output value for the channel, that is taken by the output of the channel instead of a process datum predetermined via a process image by a control unit, and comprising a switching criteria, and switching into the power-saving state after checking by means of the control unit or by means of a power-saving control module connected to the data transmitting channel, if a power-saving state is parametrized by specification of power-saving process data and if the parametrized switching criteria for the respective channel is fulfilled by a switching criteria that is currently received together with a switching request for switching of at least one channel of input/output units into a power-saving state, or by a detected switching criteria.

* * * * *